(12) United States Patent
Cawse

(10) Patent No.: US 8,670,928 B2
(45) Date of Patent: *Mar. 11, 2014

(54) APPARATUS AND METHOD FOR OPTIMALLY RECORDING GEOGRAPHICAL POSITION DATA

(75) Inventor: Neil Charles Cawse, Oakville (CA)

(73) Assignee: Geotab, Inc., Oakville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/241,202

(22) Filed: Sep. 22, 2011

(65) Prior Publication Data

US 2012/0010810 A1 Jan. 12, 2012

Related U.S. Application Data

(63) Continuation of application No. 11/252,747, filed on Oct. 19, 2005, now Pat. No. 8,032,276.

(60) Provisional application No. 60/635,068, filed on Dec. 13, 2004.

(30) Foreign Application Priority Data

Dec. 7, 2004 (CA) ..................................... 2488030

(51) Int. Cl.
*G01S 5/14* (2006.01)
(52) U.S. Cl.
USPC ............ 701/412; 701/408; 701/117; 340/439
(58) Field of Classification Search
USPC ............ 701/301, 35, 29, 207, 200, 117, 103; 340/439, 425.5, 426.16, 540
See application file for complete search history.

(56) References Cited

U.S. PATENT DOCUMENTS

| | | | |
|---|---|---|---|
| 4,936,678 A | 6/1990 | Gordon | |
| 5,173,691 A | 12/1992 | Sumner | |
| 5,225,842 A | 7/1993 | Brown et al. | |
| 5,758,313 A * | 5/1998 | Shah et al. ................. | 455/456.2 |
| 5,815,093 A | 9/1998 | Kikinis | |
| 5,844,473 A * | 12/1998 | Kaman .......................... | 340/439 |
| 5,884,216 A * | 3/1999 | Shah et al. .................... | 701/454 |
| 5,919,239 A * | 7/1999 | Fraker et al. .................. | 701/473 |
| 5,922,040 A * | 7/1999 | Prabhakaran ................. | 701/117 |
| 6,002,982 A | 12/1999 | Fry | |
| 6,088,648 A * | 7/2000 | Shah et al. .................... | 701/117 |
| 6,131,066 A | 10/2000 | Ahrens | |
| 6,211,820 B1 | 4/2001 | Zou | |
| 6,240,294 B1 | 5/2001 | Hamilton | |
| 6,282,362 B1 | 8/2001 | Murphy | |
| 6,285,953 B1 | 9/2001 | Harrison | |
| 6,363,320 B1 | 3/2002 | Chou | |
| 6,388,581 B1 | 5/2002 | Barker | |
| 6,389,340 B1 * | 5/2002 | Rayner ......................... | 701/32.4 |
| 6,434,631 B1 * | 8/2002 | Bruno et al. ...................... | 710/6 |
| 6,473,030 B1 * | 10/2002 | McBurney et al. ...... | 342/357.43 |

(Continued)

*Primary Examiner* — Thomas Black
*Assistant Examiner* — Wae Louie
(74) *Attorney, Agent, or Firm* — Miles & Stockbridge P.C.

(57) ABSTRACT

The present invention relates to an apparatus and method for optimally recording or transmitting positional data and events of an object, said apparatus including input means to continuously provide positional data to a microprocessor and a memory device to store selected positional data wherein the microprocessor is programmed to compares new positional data from said input means to previously recorded log of positional data and creates a new log if the new positional data differs from the previously recorded log in accordance with pre-determined parameters.

24 Claims, 3 Drawing Sheets

(56) References Cited

U.S. PATENT DOCUMENTS

| | | | |
|---|---|---|---|
| 6,493,631 B1 | 12/2002 | Burns | |
| 6,526,341 B1 * | 2/2003 | Bird et al. | 701/31.4 |
| 6,542,077 B2 * | 4/2003 | Joao | 340/426.16 |
| 6,556,905 B1 * | 4/2003 | Mittelsteadt et al. | 701/32.4 |
| 6,646,594 B1 * | 11/2003 | Barber et al. | 342/357.23 |
| 6,718,239 B2 | 4/2004 | Rayner | |
| 6,845,318 B1 * | 1/2005 | Moore et al. | 701/454 |
| 6,865,457 B1 * | 3/2005 | Mittelsteadt et al. | 701/33.4 |
| 6,922,133 B2 * | 7/2005 | Wolfe | 340/5.9 |
| 7,085,576 B2 * | 8/2006 | Ranganathan | 455/456.1 |
| 7,123,188 B2 | 10/2006 | Needham | |
| 7,155,376 B2 | 12/2006 | Yang | |
| 7,468,661 B2 * | 12/2008 | Petite et al. | 340/540 |
| 7,538,690 B1 * | 5/2009 | Kaplan et al. | 340/932.2 |
| 7,693,662 B2 * | 4/2010 | Yamada | 701/301 |
| 8,032,276 B2 * | 10/2011 | Cawse | 701/32.4 |
| 2001/0047244 A1 | 11/2001 | Harrison | |
| 2002/0049529 A1 | 4/2002 | Ikeda | |
| 2002/0190851 A1 | 12/2002 | Skibinski | |
| 2003/0040272 A1 | 2/2003 | Lelievre | |
| 2003/0149530 A1 | 8/2003 | Stopczynski | |
| 2003/0169161 A1 | 9/2003 | Brown | |
| 2003/0169185 A1 | 9/2003 | Taylor | |
| 2004/0119612 A1 | 6/2004 | Chen | |
| 2004/0181495 A1 * | 9/2004 | Grush | 705/417 |
| 2004/0192342 A1 * | 9/2004 | Ranganathan | 455/456.1 |
| 2005/0171663 A1 * | 8/2005 | Mittelsteadt et al. | 701/35 |
| 2006/0119507 A1 * | 6/2006 | Cawse | 342/357.13 |
| 2006/0176193 A1 | 8/2006 | Wraight | |
| 2006/0184013 A1 | 8/2006 | Emanuel | |
| 2008/0221776 A1 * | 9/2008 | McClellan | 701/103 |
| 2008/0252487 A1 * | 10/2008 | McClellan et al. | 340/936 |
| 2008/0255722 A1 * | 10/2008 | McClellan et al. | 701/35 |
| 2008/0258890 A1 * | 10/2008 | Follmer et al. | 340/439 |
| 2008/0262670 A1 * | 10/2008 | McClellan et al. | 701/29 |
| 2008/0294690 A1 * | 11/2008 | McClellan et al. | 707/104.1 |
| 2009/0051510 A1 * | 2/2009 | Follmer et al. | 340/425.5 |

* cited by examiner

APPARATUS AND METHOD FOR OPTIMALLY RECORDING GEOGRAPHICAL POSITION DATA

CROSS-REFERENCE TO RELATED APPLICATION

This application is a continuation of application Ser. No. 11/252,747 filed Oct. 19, 2005, which claims the benefit of Provisional Application No. 60/635,068 filed Dec. 13, 2004.

BACKGROUND OF THE INVENTION

1. Field of the Invention

This invention relates to a method and apparatus for optimally recording or transmitting geographical position and events. In particular the present invention provides apparatus to determine position, time and speed of an object such as a vehicle and log data in accordance with changes in pre-determined parameters.

2. Description of the Prior Art

Recording or transmitting the position (latitude, longitude and possibly altitude) and events that occur for an object is a useful exercise in many scenarios in business. There are many examples of systems that today record and or transmit positional data, but they all suffer from the same problems. They do not correctly choose the positions that are to be stored or transmitted, so as to maximize the level of useful detail on a map but at the same time minimize the number of actual positions used to do this. Many systems currently base their logging on an interval (eg. every 60 seconds) or a distance (eg. every 200 m). When looking at this data on a map, very often these points don't show any new useful additional information or, which is worse they miss out a significant event like a turn or a big drop in speed.

The present invention is used to optimize exactly when these pieces of information are recorded or transmitted. This then minimizes the memory requirements if these points are stored, or it minimizes time or cost if the information is transmitted. In addition, the usefulness of the information is maximized by making sure that any significant events are caught, like turning a corner or a large change in speed.

SUMMARY OF THE INVENTION

It is an object of the invention to provide a method to optimize exactly when positional data is recorded or transmitted to minimize the memory requirements if the data is stored, or minimize time or cost if the data is transmitted.

It is a further object of the invention to provide a method to optimize exactly when positional data is recorded or transmitted to ensure that any significant events are captured, like a change in direction arising from turning a corner or a large change in speed.

It is a further object of the invention to provide apparatus to determine positional data associated with an object, compare new positional data with existing data to determine when positional data is recorded or transmitted.

Thus in accordance with the present invention there is provided apparatus for optimally recording or transmitting positional data and events of an object, said apparatus including input means to continuously provide positional data to a microprocessor and a memory device to store selected positional data wherein the microprocessor is programmed to compare new positional data from said input means to previously recorded log of positional data and creates a new log if the new positional data differs from the previously recorded log in accordance with pre-determined parameters. In a preferred embodiment for use with a vehicle, the input means to continuously provide positional data includes a GPS antenna and GPS engine and the positional data provided to the microprocessor includes the exact time, position and speed of the vehicle. No new information is recorded if the velocity vector of the vehicle has not changed. The velocity vector is determined by monitoring the speed and heading of the vehicle. If these do not change by more than a threshold then no logs are taken. In turn, if these elements change rapidly then the logs should be taken more frequently. Additional events that are of interest are also being monitored by other input means, then these could trigger a log even if there were no geographical reason to do so.

In another embodiment the present invention provides a system for optimally recording or transmitting positional data and events of an object, said system having a processing unit on the object, said processing unit including input means to continuously provide positional data to a microprocessor and a memory device to store selected positional data wherein the microprocessor is programmed to compares new positional data from said input means to previously recorded log of positional data and creates a new log if the new positional data differs from the previously recorded log in accordance with pre-determined parameters and a base station programmed with software to extract, display, process and analyze the recorded data.

A further aspect of the present invention provides a method for optimally recording or transmitting positional data and events of an object to optimize exactly when positional data is recorded or transmitted to minimize the memory requirements if the data is stored, or minimize time or cost if the data is transmitted and to ensure that any significant events are captured by continuously providing positional data to a microprocessor from input means, said microprocessor compares new positional data from said input means to previously recorded log of positional data and creates a new log if the new positional data differs from the previously recorded log in accordance with pre-determined parameters.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
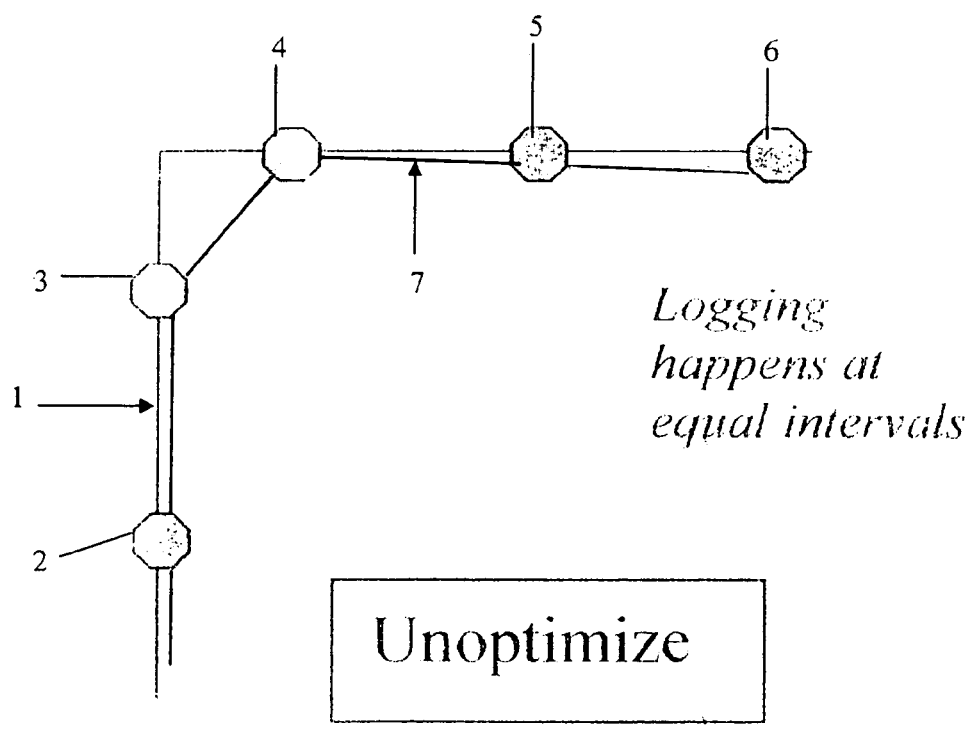
FIG. 1 is a schematic illustration of a positional chart of a prior art system that logs at positional data for an object at regular time or distance intervals (prior art).
Figure 2:
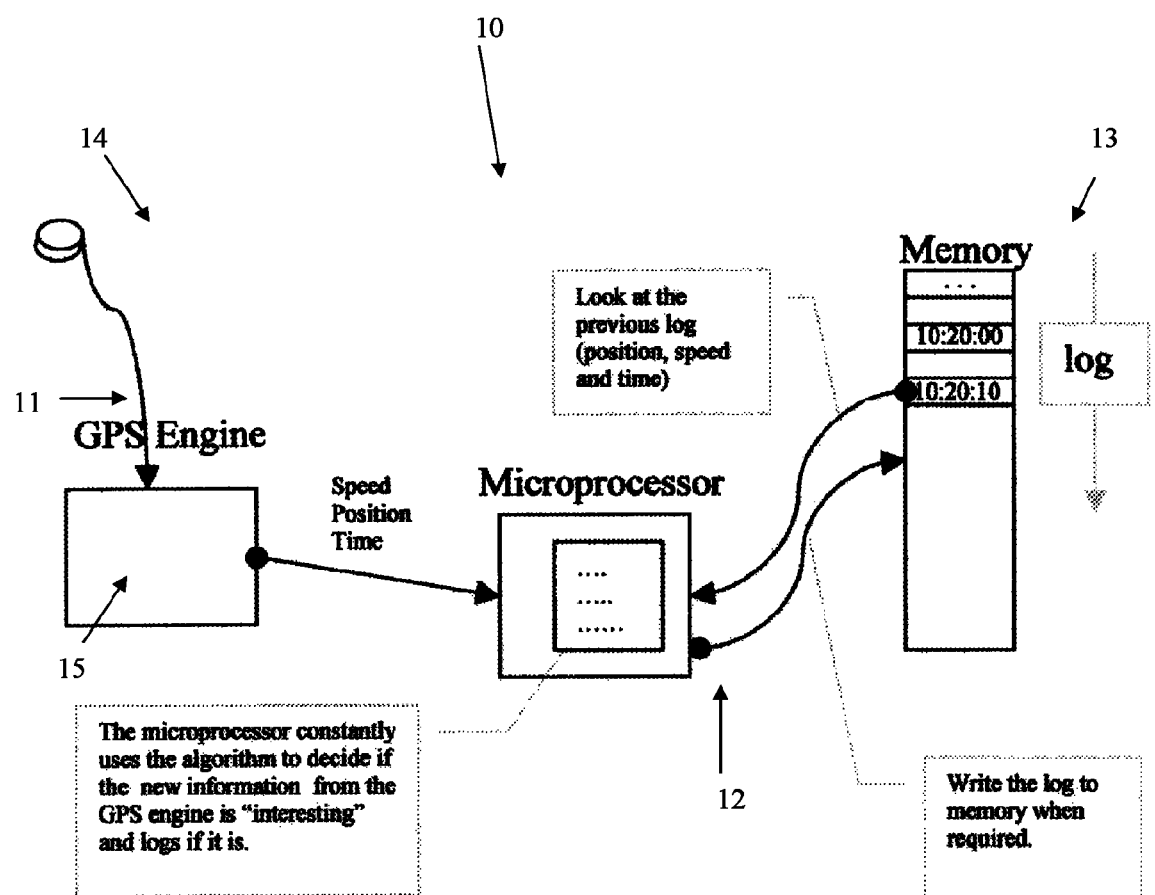
FIG. 2 is a schematic illustration of one embodiment of apparatus according to the present invention for optimally recording or transmitting geographical position and events.

Referring to FIG. 1 a schematic illustration of a positional chart of a prior art system that logs at positional data for an object at regular time or distance intervals is shown. The actual trip for the object is designated by line 1. The system logs positional data at regular intervals 3,4,5 from starting point 2 to end point 6. Connecting points 2-6, as shown by line 7, shows the apparent route of the object. The apparent route 7 does not accurately reflect the actual trip 1.

One embodiment of apparatus for optimally recording or transmitting positional data and events of an object, preferably a vehicle, according to the present invention is generally indicated at 10. The apparatus 10 consists of input means 11 to continuously provide positional data to a microprocessor 12 and memory device 13 to store selected positional data. The input means 11 to continuously provide positional data preferably includes a GPS antenna 14 and conventional GPS engine 15. The GPS engine 15 delivers the positional data preferably the exact time, position and speed of the object, to microprocessor 12. Microprocessor 12 compares the new positional data to the previously recorded log of positional data to determine the time that has elapsed since that previous log, the change in speed and heading or other input triggers and creates a new log if the information is deemed to be "new and interesting" in accordance with pre-determined parameters. The pre-determined parameters preferably include harsh braking, excessive speed, change in heading at high speed, change in heading at low speed, change in speed, and time since last log. If the differences in positional data are greater than a pre-determined minimum, microprocessor 12 stores the positional data on memory device 13 for subsequent download or transmittal. If the differences in positional data are not greater than the pre-determined minimum, microprocessor 12 does not store the new positional data on memory device 13 thereby optimizing exactly when positional data is recorded to minimize the memory requirements if the data is stored, to minimize the time or cost when the data is transmitted and/or to ensure that any significant events are captured, like a change in direction arising from turning a corner or a large change in speed.

Figure 3:
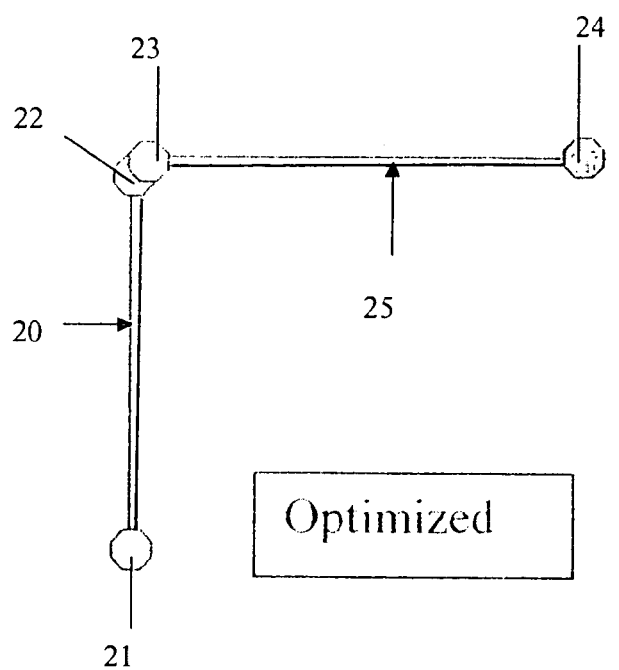
FIG. 3 is a schematic illustration of a positional chart using the apparatus of FIG. 2 where the positional data for an object has been optimally recorded.

FIG. 3 illustrates a schematic of a positional chart using the embodiment of apparatus for optimally recording or transmitting positional data and events of an object 1 where the positional data for the object has been optimally recorded. In this case the actual trip for the object is designated by line 20. The system logs positional data at starting point 21, at point 22 where a change in speed is determined, point 13 where a change of direction is determined and end point 14. Connecting points 21-24, as shown by line 25, shows the apparent route of the object which reflects more accurately the actual trip 20 than the prior art system illustrated in FIG. 1 even though positional data is logged at fewer points.

Microprocessor 12, in an embodiment, is programmed to compare and select position data to be recorded as follows:

```
// check valid GPS data against logging criteria
void ValidGPS(void)
{
unsigned long lTemp;
unsigned char bDiff;
    bInvalidCount = 0;                    // reset invalid
                                          count
    GPS.GPSData.bAux.gps_valid = 1;       // valid flag
    GPS.GPSData.bRecordType = GPS_RECORD;// log record type
    // store valid vars
    lValidDate = GPS.GPSData.lDateTime;
    lValidLat.full = GPS.GPSData.lLat.full;
    lValidLong.full = GPS.GPSData.lLong.full;
    // accident data check
    if (GPS.GPSData.bSpeed > bMinAccSpeed)
        bMemFlags.save_acc = 1;
    if (bFlags3.valid_gps_restart)
    {
        if (bHarshBrake != 0)
        {
            if (bValidSpeed > GPS.GPSData.bSpeed)
            {
                bDiff = bValidSpeed - GPS.GPSData.bSpeed;
                if (bDiff > bHarshBrake)
                {
                    GPS.GPSData.bLogReason =
LOG_HARSH_BRAKE; // speeding start
                    bMemFlags.save_log = 1;
                }
            }
        }
    }
    bValidSpeed = GPS.GPSData.bSpeed;
    bFlags3.valid_gps_restart = 1;
    // check log next valid flag - set on ign
    if (bFlags3.log_next_valid)
    {
        if (bOptions0.beep_on_log || bFlags3.debug)
        {
            BUZZER_ON;
            Delay10KTCYx(250);
            Delay10KTCYx(250);
        }
        bFlags3.log_next_valid = 0;
        GPS.GPSData.bLogReason = LOG_NEXT;     // log first valid after ign
        bMemFlags.save_log = 1;
        return;
    }
    // if harsh braking occurred above then exit
    if (bMemFlags.save_log)
        return;
    if (bOptions0.speeding)
    {
        // if not speeding
        if (!bFlags2.speeding)
        {
            // and speeding occurs
            if (GPS.GPSData.bSpeed > bSpeedingSpeed)
            {
                // start indicator and log
                bFlags2.speeding = 1;
                GPS.GPSData.bLogReason =
LOG_SPEEDING_START;      // speeding start
                bMemFlags.save_log = 1;
                return;
            }
        }
        // else if speeding
        else
        {
            // and get to reset speed
            if (GPS.GPSData.bSpeed <= bResetSpeed)
            {
                BUZZER_OFF;                    // just in case
                // stop indicator and log
                bFlags2.speeding = 0;
                GPS.GPSData.bLogReason =
LOG_SPEEDING_STOP;       // speeding stopped
                bMemFlags.save_log = 1;
                return;
            }
        }
    }
    // change in heading at hi speed
    if (GPS.GPSData.bSpeed > bHiDeltaHeadMinSpeed)
    {
        if ((GPS.GPSData.bHeading < 37) &&
        (bLastHeading > 113))
        {
            bDiff = GPS.GPSData.bHeading + (150 - bLastHeading);
        }
        else if ((bLastHeading < 37) &&
        (GPS.GPSData.bHeading > 113))
        {
            bDiff = bLastHeading + (150 - GPS.GPSData.bHeading);
        }
        else if (GPS.GPSData.bHeading > bLastHeading)
        {
```

-continued

```
        bDiff = GPS.GPSData.bHeading - bLastHeading;
    }
    else
    {
        bDiff = bLastHeading - GPS.GPSData.bHeading;
    }
    if (bDiff > bHiDeltaHead)
    {
        GPS.GPSData.bLogReason = LOG_HEADING;        // change in heading
        bMemFlags.save_log = 1;
        return;
    }
}
// change in heading at low speed
else if (GPS.GPSData.bSpeed > bDeltaHeadingMinSpeed)
{
    if ((GPS.GPSData.bHeading < 37) &&
        (bLastHeading > 113))
    {
        bDiff = GPS.GPSData.bHeading + (150 - bLastHeading);
    }
    else if ((bLastHeading < 37) &&
        (GPS.GPSData.bHeading > 113))
    {
        bDiff = bLastHeading + (150 - GPS.GPSData.bHeading);
    }
    else if (GPS.GPSData.bHeading > bLastHeading)
    {
        bDiff = GPS.GPSData.bHeading - bLastHeading;
    }
    else
    {
        bDiff = bLastHeading - GPS.GPSData.bHeading;
    }
    if (bDiff > bDeltaHeading)
    {
        GPS.GPSData.bLogReason = LOG_HEADING;        // change in heading
        bMemFlags.save_log = 1;
        return;
    }
}
// change in speed
if (GPS.GPSData.bSpeed > bDeltaSpeedMinSpeed)
{
    if (GPS.GPSData.bSpeed >bLastSpeed)
        bDiff=GPS.GPSData.bSpeed - bLastSpeed;
    else
        bDiff=bLastSpeed - GPS.GPSData.bSpeed;
    if (bDiff > bDeltaSpeed)
    {
        GPS.GPSData.bLogReason = LOG_SPEED;   // change in speed
        bMemFlags.save_log = 1;
        return;
    }
}
// time since last log
if (GPS.GPSData.lDateTime - lLastDate > iMinLogTime.full)
{
    GPS.GPSData.bLogReason = LOG_TIME;       // time elapsed
    bMemFlags.save_log = 1;
    return;
}
if (bOptions0.log_valid)
{
    GPS.GPSData.bLogReason = LOG_ALL;        // log all valid option set
    bMemFlags.save_log = 1;
    return;
```

In an embodiment the microprocessor 12, GPS engine 15 and optionally the memory device 13 to store selected positional data are provided in an in-vehicle processing unit which is in a sealed housing. In lieu of the memory device 13 being included in the vehicle processing unit, a separate portable memory device (such as memory stick, disc or key can be provided). Appropriate wiring harness would be provided to easily connect the in-vehicle processing unit containing the microprocessor 12, and GPS engine 15 to the vehicle electrics, GPS antenna 14 and other inputs or outputs including memory device 13.

In another embodiment, the present invention provides a system which includes a base station piece programmed with software to extract, display, process and analyze the recorded vehicle data. Where a portable memory device 13 is used in conjunction with the in-vehicle processing unit, data maybe "extracted" from the portable memory device or directly from the vehicle via a wireless connection such as 900 MHz radio or through a GSM/GPRS/Internet communication medium or other like method and transmitted to the base station.

The additional inputs can include an identification key to identify individual drivers or vehicles or permit updating or modification of the software in the microprocessor unit 12 to set parameters on which the system is customized to compare and log data.

The base station and its software can be used as noted above to view trip data on a map, produce activity reports including list of trips, speed profile, auxiliary usage and the like. In addition the software can be customized to set rules for determining when a log point should be recorded by monitoring data such as speed, stop time, auxiliary useage or vehicle position relative to prescribed zones such as customer locations.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A fleet asset management system comprising an apparatus including a memory device in which is stored a record of selected positional data about one or more fleet vehicles, wherein the apparatus operates to create said record by:
   a) receiving new position data from the one or more vehicles, respectively;
   b) determining change between the new position and the position last recorded by the apparatus, respectively, for the one or more vehicles;
   c) determining in each respective case, the elapsed time between when the respective vehicle was at the new position and when the respective vehicle was at the position last recorded by the apparatus;
   d) selecting the new data received in step a) for logging in step e) when said change in position in relation to said elapsed time exceeds predetermined parameters;
   e) logging, for respective vehicles, data selected in step d) in said memory device; and
   f) repeating steps a) through e); thereby creating said record of selected positional data.

2. The system of claim 1, wherein the positional data is received from a global positioning system (GPS) receiver located in or around the vehicle.

3. system of claim 1, wherein the predetermined parameters cause the apparatus to record the new positional data and time if there is a change in speed and/or heading of the vehicle.

4. The system of claim 1, wherein the predetermined parameters cause the apparatus to record the new positional data and time if the data indicate harsh braking, excessive speed, or a change in heading, at high or low speed, of the vehicle.

5. The system of claim 1, wherein the apparatus is adapted to be located at a base station and receive positional data wirelessly transmitted from a position locating device situated in or around the vehicle.

6. The system of claim 1, wherein respective ones of said one or more vehicles includes an on-board one of said apparatus including a memory device.

7. The system of claim 6, wherein the memory device is a separate portable recording device.

8. The system of claim 6, wherein the on-board apparatus is adapted to transmit positional data and time selected for recording because the difference in positional data and/or elapsed time exceeds said pre-determined parameters.

9. The system of claim 8 further comprising a base station programmed to analyze the recorded data.

10. The system of claim 9, wherein the system is adapted to display trip data on a map.

11. The system of claim 9, wherein the system is adapted to produce activity reports that include a list of trips and speed profiles of the object.

12. The system of claim 9, wherein the system is adapted to produce activity reports identifying individual drivers or vehicles.

13. A fleet asset management system including an apparatus comprising a microprocessor that is programmed to selectively cause positional data for respective ones of one or more managed vehicles to be recorded by repeatedly:
 a) receiving new positional data from a global positioning system (GPS) receiver located in or around said managed vehicle;
 b) determining change in position between the new positional data and previous positional data about the managed vehicle last recorded by the apparatus;
 c) determining elapsed time between when the new positional data were obtained and when said last recorded positional data were obtained;
 d) determining change of the managed vehicle's position as a function of the elapsed time; and
 e) in the event that a change of the vehicle's position in relation to the elapsed time exceeds pre-determined parameters, causing such data to be recorded.

14. The system of claim 13, wherein the predetermined parameters cause the apparatus to record the new positional data and time if there is a change in speed and/or heading of the vehicle.

15. The system of claim 13, wherein the predetermined parameters cause the apparatus to record the new positional data and time if the data indicate harsh braking, excessive speed, or a change in heading, at high or low speed, of the vehicle.

16. The system of claim 13, wherein the apparatus is adapted to be located at a base station and receive positional data wirelessly transmitted from a GPS receiver located in or around the managed vehicle.

17. The system of claim 13, wherein the apparatus is disposed in respective ones of the managed one or more vehicles.

18. A system for processing information about a vehicle, comprising the apparatus of claim 13, and a base station programmed to analyze the recorded data and provide the user with a display or report of the analyzed data.

19. The system of claim 13, including a base station programmed to analyze the recorded data and provide the user with a display or report of the analyzed data.

20. A fleet asset management system including an apparatus for autonomously recording vehicular data for one or more managed fleet vehicles, including vehicular position/time data, said apparatus comprising:
 (a) a memory device for selectively logging a plurality of vehicular data points; and,
 (b) a microprocessor that operates to compare a last logged vehicular position/time data point with subsequently received vehicular position/time data to calculate positional change over a corresponding intervening interval of elapsed time between said last logged data point and said subsequently received vehicular position/time data, wherein said memory device selectively logs vehicular data whenever said positional change in relation to said elapsed time exceeds predetermined parameters.

21. The system of claim 20, wherein the predetermined parameters cause the apparatus to record the new positional data and time if there is a change in speed and/or heading of the vehicle.

22. The system of claim 20, wherein the predetermined parameters cause the apparatus to record the new positional data and time if the data indicate harsh braking, excessive speed, or a change in heading, at high or low speed, of the vehicle.

23. The system of claim 20, wherein the apparatus is adapted to be located at a base station and receive positional data wirelessly transmitted from a GPS receiver located in or around the managed vehicle.

24. The system of claim 20, wherein the apparatus is disposed in respective ones of the managed one or more vehicles.

* * * * *